Nov. 11, 1958   M. REYMOND   2,859,444
EXPLOSIVELY ACTUATED GUN
Filed March 26, 1954   6 Sheets-Sheet 1

Inventor:
Michel Reymond
by: J. Delatter-Lyng
Attorney

Nov. 11, 1958  M. REYMOND  2,859,444
EXPLOSIVELY ACTUATED GUN
Filed March 26, 1954  6 Sheets-Sheet 2
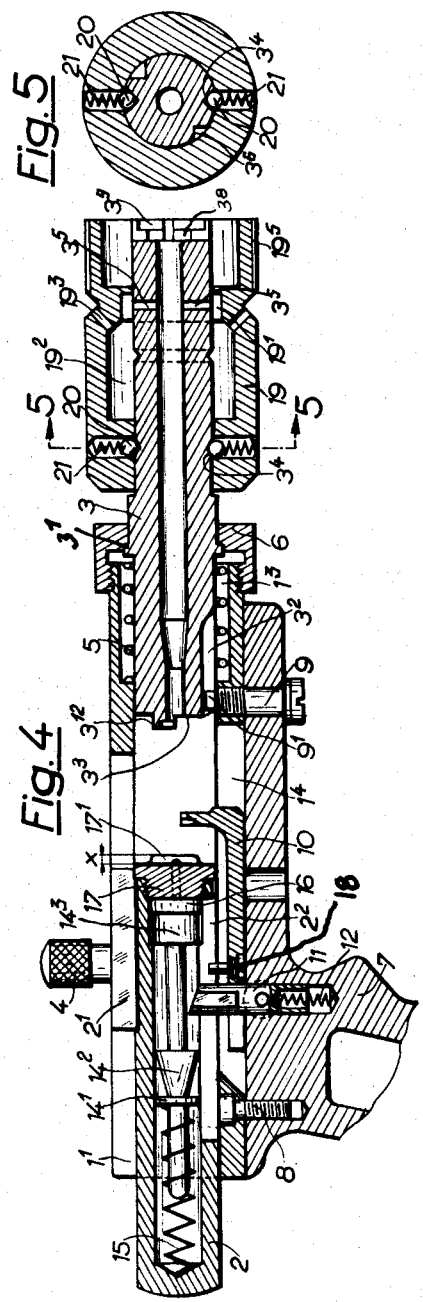
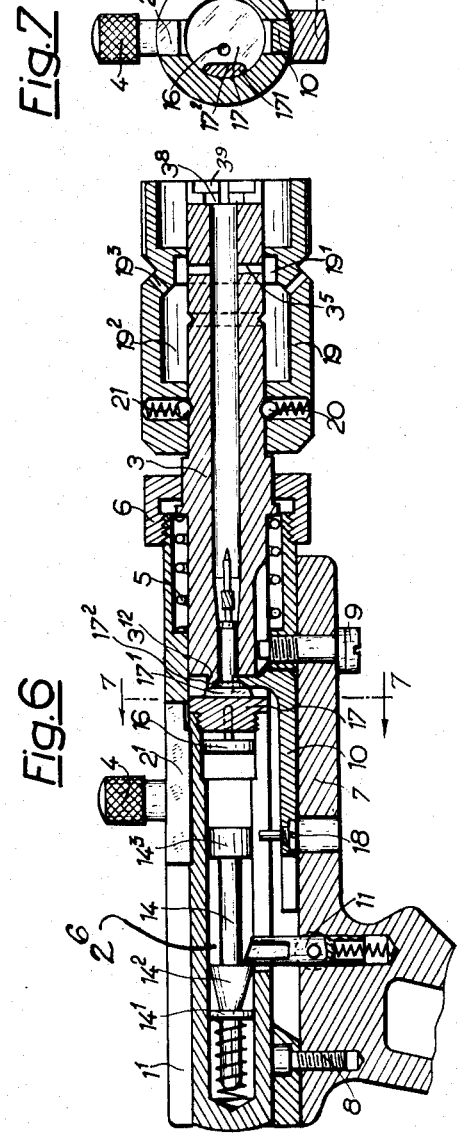
Inventor:
Michel Reymond
by: J. Delatter-Segy
Attorney Nov. 11, 1958  M. REYMOND  2,859,444
EXPLOSIVELY ACTUATED GUN
Filed March 26, 1954  6 Sheets-Sheet 3
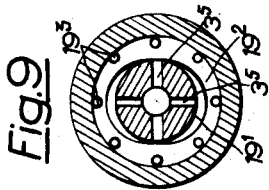
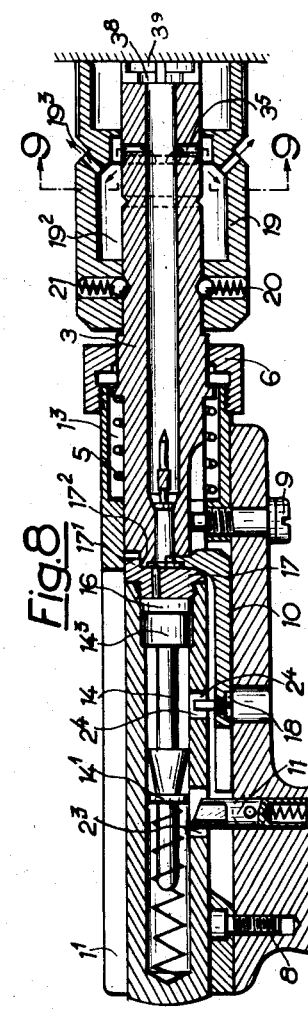
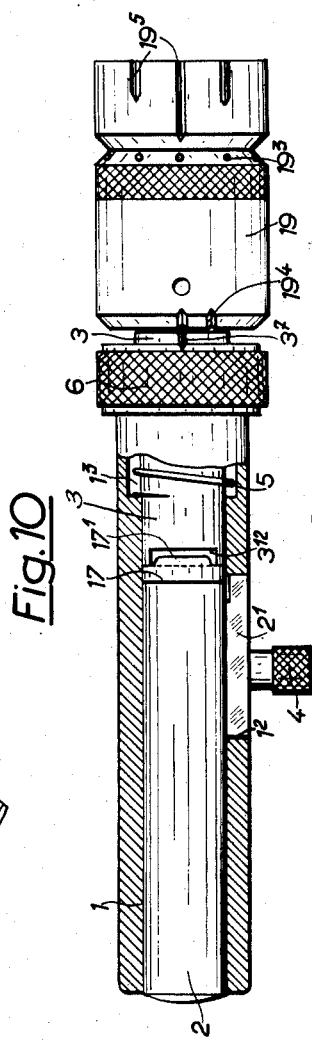
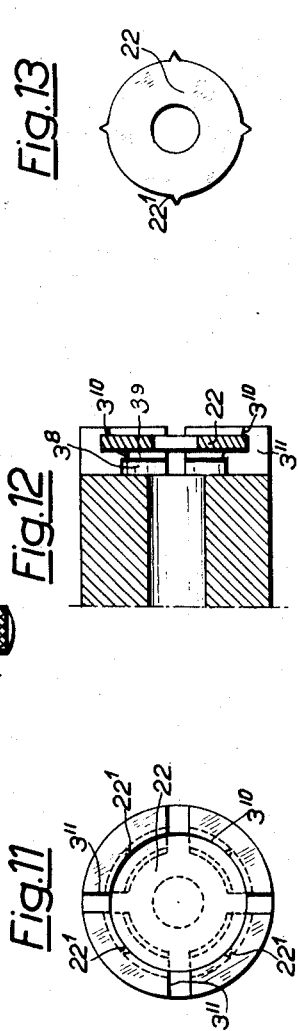
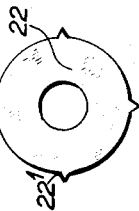
Inventor:
Michel Reymond
by: J. Delattre-Seguy
Attorney

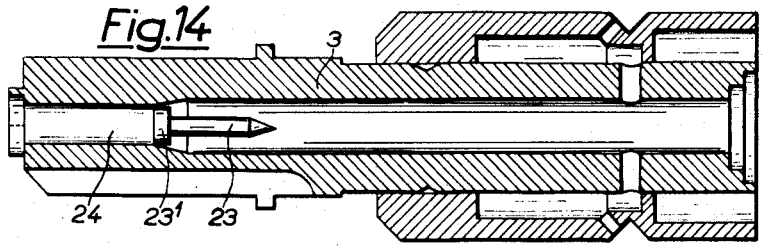
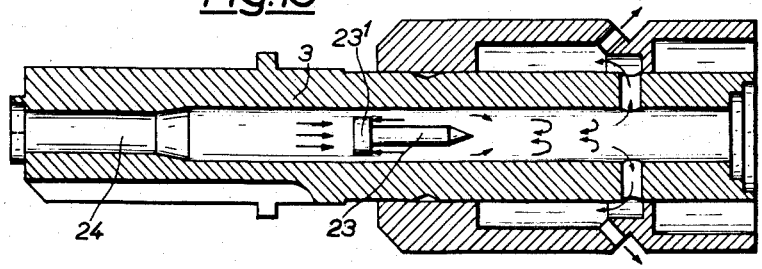
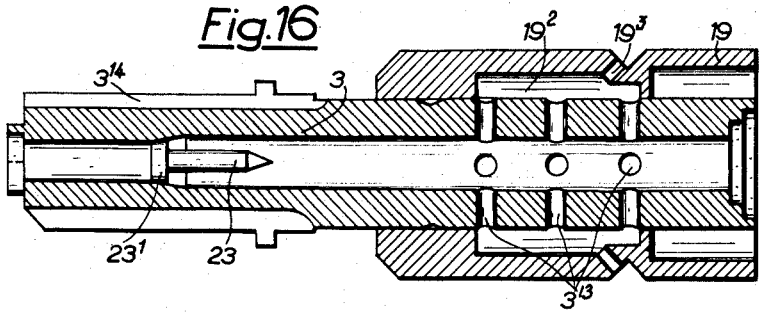
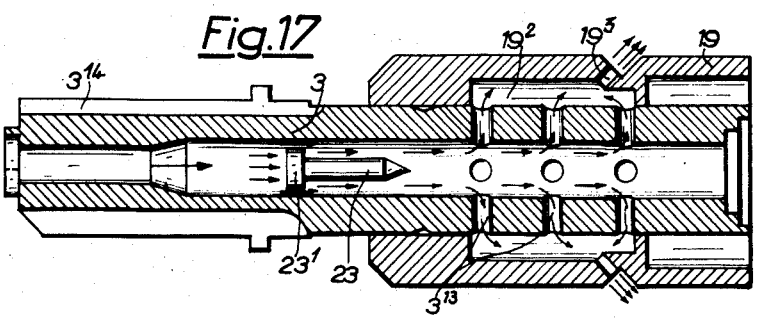

Nov. 11, 1958 M. REYMOND 2,859,444
EXPLOSIVELY ACTUATED GUN
Filed March 26, 1954 6 Sheets-Sheet 6
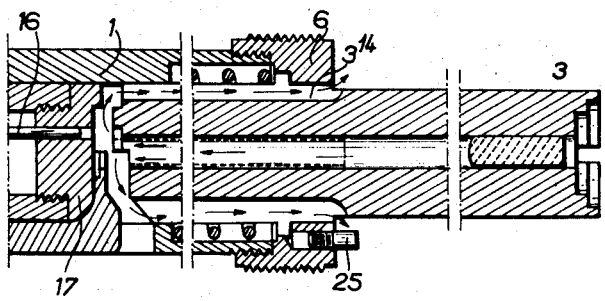
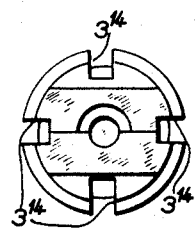
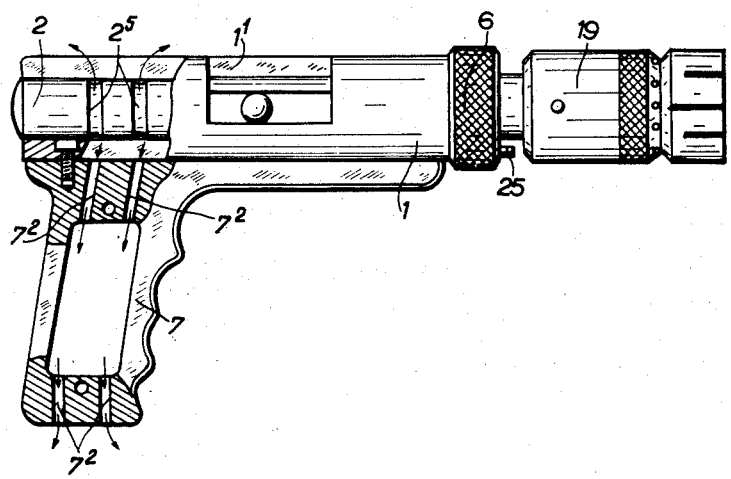
Inventor:
Michel Reymond
by J. Delattre-Seguy
Attorney

United States Patent Office 2,859,444
Patented Nov. 11, 1958

2,859,444
EXPLOSIVELY ACTUATED GUN

Michel Reymond, St-Etienne, France, assignor to Société Civile d'Etude de Procédés de Scellement, Saint-Etienne, France, a corporation of France Application March 26, 1954, Serial No. 418,930

Claims priority, application France April 1, 1953

9 Claims. (Cl. 1—106)

The explosively actuated guns known hitherto show various drawbacks among which:

It is necessary to dismantle the different parts each time the cartridge is to be replaced, which implies a difficult and dangerous operation when the workman stands on a ladder and when the impact requires a shock which is independent of the pressure to be exerted;

The absence of any arrangement for holding temporarily the washers inserted at the end of the gun barrel and for preventing them from dropping to the ground when it is desired to drive into a horizontal surface such as that of a floor;

The absence of any adjusting means for the silencer which cannot consequently serve for limiting the pressure of the gases.

The explosively actuated gun, according to my invention, removes these drawbacks. It includes chiefly a breech casing, the wall of which is provided with two longitudinal slots and with a peripheral recess opening laterally into the front end of the first slot, a longitudinally bored breech block slidingly carried inside said casing and provided with a longitudinal slot between its bore and its outer periphery and with a transverse cut opening into said slot at a point of its length, a short key rigid with the breech block, engageable in the first slot of the breech casing and adapted to be shifted angularly around the axis of the casing into the lateral recess when registering with the latter towards the front end of the sliding movement of the breech block, hand-operable means rigid with said key for controlling the movements of the bolt and breech block rigid therewith, a perforated plug fitted over the front end of the breech block, a striker mechanism extending through the bore in the breech block and the front end of which is adapted to engage the perforation in the plug and a barrel the rear end of which slidingly engages the inside of the front end of the breech block casing; said barrel being adapted to engage through its rear end the plug on the breech block in its advanced position to provide for the striking of the cartridge in said rear end by the front end of the striker mechanism while a stop rigid with the casing limits the forward movement of the barrel and a spring inside the casing urges the barrel forwardly into engagement with said stop; a grip rigidly secured to the casing and provided with a bore registering with the second slot in the casing and with the slot of the breech block and opening perpendicularly into same; a spring-urged trigger rod slidingly engaging the bore in the grip and entering through the second slot in the casing and the slot in the breech block into engagement with the striker mechanism inside the bore in the breech block; the location of the bore in the grip registering with the cut in the breech block in its foremost position, the trigger sliding through said transverse cut during the angular shifting of the key on the breech block into the lateral recess; lastly a hand-operable member projecting outside the grip controlling the striker to disengage the latter with reference to the striker mechanism against the action of last-mentioned spring, and elastic means urging the striker mechanism into operative engagement with the cartridge in the barrel.

In the accompanying drawings which illustrate by way of example and by no means in a binding sense various embodiments of the improved gun:

Fig. 4 is a longitudinal cross-section of the gun after recoil of the breech-block 2, to allow the feeding of a new cartridge, after ejection of an exhausted cartridge during said recoil;

Fig. 5 is a transverse cross-section along line 5—5 of Fig. 4;

Fig. 6 is a longitudinal cross-section of the gun after the breech-block has been locked, after the gun has been loaded, the striker rod 14 being set in position immediately prior to firing;

Fig. 7 is a transverse cross-section along line 7—7 of Fig. 6, looking toward the rear of the gun;

Fig. 8 is a longitudinal cross-section of the gun immediately following controlled percussion by lowering rod 11, striker 16 being in striking position;

Fig. 9 is a transverse cross-section along line 9—9 of Fig. 8;

Fig. 10 is a view partly in elevation and partly in cross-section, corresponding to Fig. 8, but illustrating particularly the operative relation of boss 17$^1$ with gun barrel 3;

Fig. 11 is an outer front view corresponding to Fig. 12;

Fig. 12 is a sectional view on a larger scale of the housing provided for the washer (shown in Fig. 13) at the end of the barrel;

Fig. 13 shows a washer for use in the gun according to the invention;

Fig. 14 is an elevational sectional view of a fastener as inserted in the gun barrel;

Fig. 15 is a view similar to Fig. 14, the fastener being shown in a position assumed after the cartridge has been submitted to impact, said fastener progressing inside the barrel;

Fig. 16 is a further elevational, partly sectional view of a second embodiment of the gun barrel with the fastener inserted prior to firing;

Fig. 17 is a view similar to Fig. 16 with the fastener in the position it occupies as it progresses through the gun barrel after the cartridge has been submitted to impact;

Fig. 21 shows the arrangement for the exhaust of the gases in the case of the barrel being clogged, as relating to the embodiments shown in the foregoing figures;

Fig. 22 is a view of the gun barrel shown in Fig. 21 as seen from the rear;

Fig. 23 is an external view, with certain parts cut-away, of a gun according to the invention, incorporating additional means for exhausting the gases from the rear of the gun.

The gun illustrated includes a tubular breech casing 1 inside which is slidingly carried the movable breech block 2; the end of the gun barrel 3 is also slidingly mounted in the front section of the breech casing.

The movable breech block 2 is housed coaxially and is guided inside the breech casing 1 by means of a key $2^1$ slidingly fitted in the longitudinal slot $1^1$ formed at the upper end of the breech casing 1.

Figure 2:
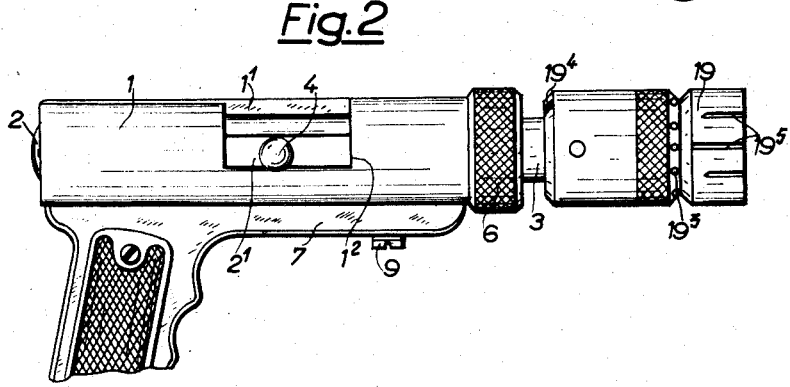
Fig. 2 is an elevational lateral view of the gun on the side carrying the breech controlling lever.
Figure 3:
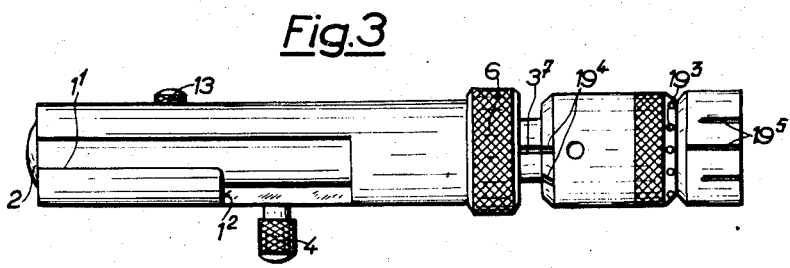
Fig. 3 is a plan view from above corresponding to Figs. 1 and 2.

The slot $1^1$ opens into a notch $1^2$ (Figs. 2 and 7) which allows the movable breech block to turn by a quarter of a revolution, so as to be locked in the position illustrated in Fig. 2. A control lever 4 rigid with the key $2^1$ is provided for operating this locking movement. The locking of breech-block 2 in its armed position is effected by means of key $2^1$ rigid with the breech-block; in the by arming step, key $2^1$ serves as a guide in slot $1^1$ of the breech-casing; then for the locking step, the breech block 2 can be pivoted by key $2^1$ which then engages notch $1^2$ of the breech-casing.

The front section of the breech casing 1 opens into a coaxial cylindrical chamber $1^3$ adapted to house a coil spring 5. The latter exerts a permanent thrust on the rear surface of the collar $3^1$ of the barrel 3 (Fig. 4). The collar $3^1$ abuts through its front against the bottom of a corresponding recess formed in the ring-nut 6 screwed over the threaded end of the breech case enclosing the chamber $1^3$. Thus the barrel 3 is allowed to slide axially and to execute a predetermined stroke inside the breech casing 1 against the thrust exerted by said spring 5.

To the lower end of the breech casing 1 is secured a unitary grip 7, as provided by the screws 8 and 9 (Fig. 6). A smooth bearing $9^1$ obtained by cutting the inner end of the screw 9 engages a slot $3^2$ formed in the rear section of the gun barrel 3 so as to guide axially the latter.

The upper surface of the grip 7 (Figs. 4 and 6) serves as a bearing for the extractor 10 for spent cartridges which slides inside a slot $1^4$ formed over a predetermined length of the lower part of the breech casing 1. The extractor 10 the sides of which are flat includes a front end bent upwardly in the shape of a square so as to be capable of engaging the lower recess $3^3$ formed at the rear end of the barrel.

The upper end of the grip 7 is bored vertically so as to receive slidingly the trigger constituted by a cylindrical rod 11 urged upwardly and permanently by a coil spring 12. The rod 11 enters the slot $1^4$ of the breech casing and engages, upon opening of the breech block, the slot $2^2$ formed in the movable breech block.

Figure 1:
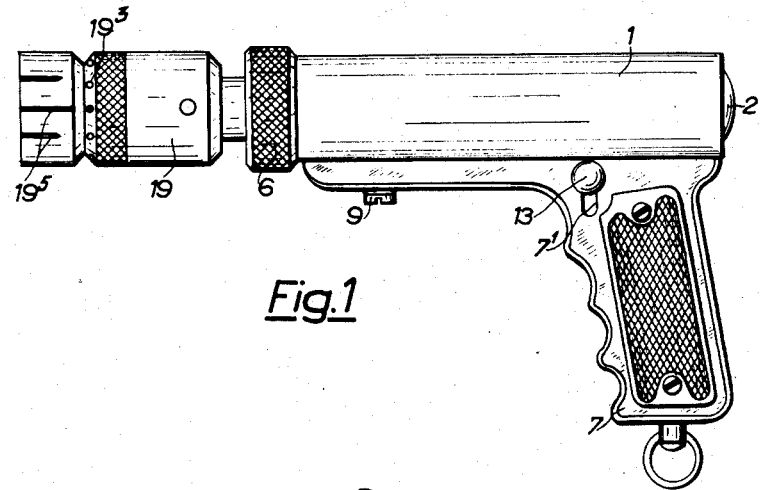
Fig. 1 is an elevational lateral view of the trigger side of the gun according to the invention.

A control knob 13 which is screwed perpendicularly into the rod 11, projects outwardly of the grip 7. It is possible to shift vertically said knob inside a slot $7^1$, said knob carrying along with it the rod 11 so as to allow firing the gun (Figs. 1 and 4).

Inside the axial bore $2^6$ of the movable breech block is housed a striker rod 14 urged from rear to front by a coil spring 15 engaging the collar $14^1$ on said rod 14 (Figs. 4 and 6); the rod 14 is provided with a frusto-conical bearing surface $14^2$ which provides for the cocking in cooperation with the sloping end of the trigger rod 11. The front end of the rod 14 terminates with a cylindrical bearing surface $14^3$ facing the rear of the firing pin 16. The latter is held in position by a plug 17 screwed inside the tapped bore at the end of the movable breech block 2.

The end of a screw 18 screwed into the inner end of the extractor 10 engages the slot $2^2$ in the movable breech block (Figs. 4, 6, 8). When said breech block is opened, a shoulder of the plug 17 abuts screw 18 and causes the extractor 10 to recede. The plug 17 is bored so as to allow the passage through it of the striker pin and it carries facing the barrel a boss $17^1$ the inner flat surface $17^2$ of which extends vertically when the movable breech block 2 is opened (Figs. 4, 6, 7, 8). The boss $17^1$ is given a thickness $x$ which is greater than that of the projecting section of the pin carrying the hammer 16 and which is adapted to engage the cartridge case.

To the front of the barrel 3 and beyond the breech casing 1 is fitted the removable silencer 19 which serves also as a flame concealing member and as means for limiting the pressure of the gases. The location of the silencer 19 is defined by balls 20 submitted to the thrust of the coil springs 21 which urge them into recesses $3^4$ provided in the gun barrel (Figs. 4, 5, 6, 8, 9).

Two orthogonal diametral bores $3^5$ of different diameters are formed in the barrel wall so as to provide communication between the axial barrel bore and an oval-shaped chamber $19^1$ in the silencer for predetermined angular settings of the latter (Figs. 3, 6, 8, 9).

The chamber $19^1$ communicates with a further chamber $19^2$ inside which the gases are adapted to expand. Said chamber $19^2$ communicates with the outer atmosphere through the apertures $19^3$ in the silencer wall. The apertures $19^3$ open outwardly into an annular groove having a V-shaped cross-section and said apertures are cut at an angle such that the gases are projected towards the surface to be driven without any risk of said gases reaching the operator (Figs. 4, 6, 8, 9, 10).

As shown in Figs. 5 and 9, the silencer 19 may occupy in particular two angular positions defined by the selective engagement of the balls 20 inside one of the pairs of diametrically opposed recesses $3^4$ or $3^6$ (Fig. 5). According to whether the silencer occupies one of the two positions thus defined, either both pairs of diametrically opposed apertures $3^5$ communicate with the oval chamber $19^1$ or only one pair of apertures communicates therewith (Fig. 9). It is thus possible to adjust the pressure of the gases through an adjustment of the exhaust. Two marks $19^4$ (Fig. 10) are provided on the outside of the rear end of the silencer 19 and they are adapted to register for suitable angular positions of the silencer with a stationary mark $3^7$ on the barrel 3 (Fig. 10). The front end of the silencer 19 carries at its outer end marks $19^5$ which are adapted to further the centering of the gun (Fig. 10).

The front end of the barrel 3 is provided inwardly in the usual manner with two arcuate recesses $3^8$ and $3^9$ adapted to be engaged by washers of different diameters. According to the invention, the recesses $3^8$ and $3^9$ are limited each at its front end by a small arcuate bead $3^{10}$ (Fig. 12) adapted to hold transiently the washers 22 when the gun is turned down with its barrel directed towards ground. To this end and as illustrated in Fig. 13, the washers 22 are cut so as to be provided with small projections $22^1$ adapted to engage the washer slots $3^{11}$ arranged at right angles with reference to each other at the front end of the gun barrel. After a slight rotation of the washer, the projections $22^1$ engage the inside of the arcuate or annular bead $3^{10}$ (Figs. 11, 12, 13).

When operating the gun which has just been described, three stages are to be considered, to wit:

Cocking and extraction;
Closing of the breech, locking and firing;
Setting the safety means in position.

Fig. 8 illustrates the parts of the gun as they would appear immediately following the ignition of the shell. The three stages aforesaid by comparison of the location of the parts as they appear in other figs. with the showing of Fig. 8, are described hereafter.

The stage of cocking of the gun, extraction of the spent shell and insertion of a new cartridge is illustrated in Figs. 4 and 5. After the shell has been ignited (Fig. 8), the movable breech block 2 is moved rearwardly to the position shown in Fig. 4, by means of control lever 4. During this step, the movable breech block 2 is opened and is guided by the key $2^1$ slidingly engaging the slot $1^1$ in the breech casing (see also Figs. 2 and 3). Slot $1^1$ is uncovered. The slot $2^2$ guides similarly the movable breech block with reference to the cylindrical trigger rod 11 and to the screw 18. When the breech block has travelled over a predetermined distance, the conical shoulder section 14² of the striker-carrying rod 14 urges downwardly the sloping terminal surface of the cylindrical trigger rod 11 and passes rearwardly of said trigger rod; the latter moves up again (Fig. 4); then the gun is in cocking position, the spent cartridge being removed and a new cartridge inserted as explained hereafter.

During the receding movement of the movable breech block, the shoulder on the plug 17 carries along with it the screw 18 and the extractor 10 rigid with the latter (Fig. 4).

The spent cartridge is removed from the gun through slot 1¹ of the breech casing; then a new cartridge is inserted in the rear of the barrel through the same slot, the parts of the gun being at that stage in the position shown in Fig. 4.

The second operative stage corresponding to the closing of the breech block, to its locking and to the actual firing, is illustrated in Figs. 6, 7, 10. The movable breech block 2 being cocked, it is then urged forwardly and locked by a rotation through 90° which makes the key 2¹ engage and be fitted inside the notch 1² in the breech casing. This locking is allowed by the fact that the recesses 2³ and 2⁴ provide for the movements of the trigger rod 11 and of the screw 18 with reference to the breech block (Figs. 6, 7, 8).

This stage of the operation is shown in Figs. 6 and 7, which show the breech block 2 after it has been moved forward, but before locking. The locking step, by rotation of 90 degrees, can be visualized easily by comparison of Figs. 6 and 7 with Figs. 2 and 3, by reference to the position of control lever 4. At this stage also, the striker-carrying rod 14 is hooked through the front end of conical part 14² by the trigger rod 11, and the gun is then armed.

After the breech block has been locked, the operator sets the front end of the barrel 3 into engagement with the surface to be driven and presses on the grip 7 so as to produce the advance of the breech casing relative to the barrel 3, and a compression of the coil spring 5. At the end of this advance movement, the rear end of the barrel 3 engages the breech block 2 and the boss 17¹ thereon (Fig. 6). The latter is horizontal at this moment by reason of the partial rotation of the breech block as provided by its locking. The boss 17¹ consequently enters the recess 3¹² at the rear end of the gun barrel 3 (Figs. 4 and 6). The extractor 10 also engages the lower recess 3³ at the rear end of the barrel (Figs. 4 and 6).

For this position of the different parts, the rear end of the barrel 3 and the plug 17 are in contacting relationship and it is sufficient to depress the control knob 13 (Fig. 1) in order to release the rod 11 from striker rod 14 and to fire a shot.

The firing can be performed only after urging positively the barrel against the wall or the like surface to be driven, so as to produce a perfect contact between the barrel and silencer system and the wall. This condition is essential for safety and for a proper execution of the driving.

The safety of the firing is obtained, as illustrated in Figs. 6 and 7, by the boss 17¹ on the plug 17.

Figure 19:
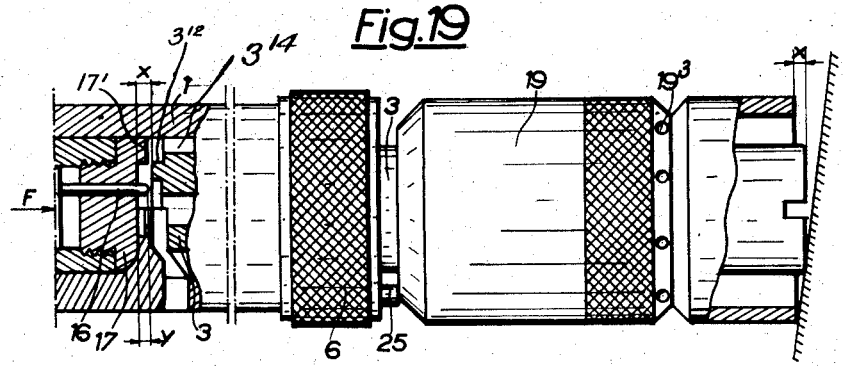
Fig. 19 is an elevational, partly sectional view showing the operation of the safety means incorporated into the gun, as embodied in the foregoing figures.
Figure 20:
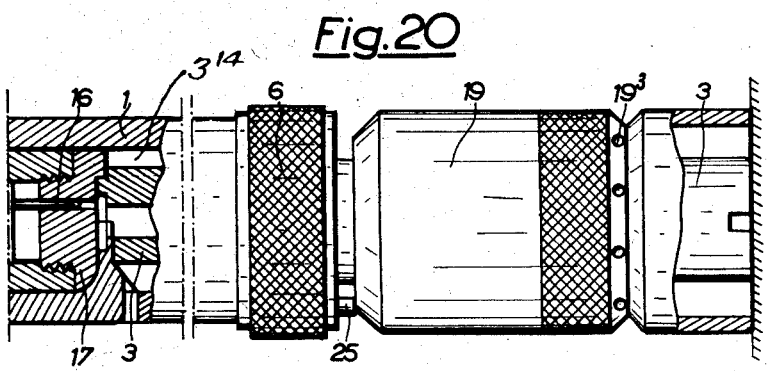
Fig. 20 illustrates the proper position of the gun when ready for firing and positioned in a direction perpendicular to the surface to be driven into.

If the end of the gun is not pressed normally on the surface to be driven, as shown in Fig. 19, boss 17¹ cannot enter the recess 3¹². The remaining interval $x$ prevents the action of the striker pin 16, and the gun cannot be fired. On the other hand, if the end of the gun is applied normally against the surface to be driven, as shown in Fig. 20, boss 17¹ can enter recess 3¹², the striker pin 16 can act on the cartridge and the gun can be fired. These two conditions are described hereafter in greater detail by reference to a description of Figs. 19 and 20.

As an additional safety, when the movable breech block 2 is not perfectly locked in position, the inner surface 17² of the boss 17¹ does not lie horizontally and the boss cannot enter the upper recess 3¹² in the gun barrel (Figs. 6 and 7). There remains, therefore, in this case, a gap the breadth of which is equal to the thickness $x$ of the boss. This gap prevents the striker pin 16 from engaging the cartridge case. When firing, it is essential for the breech block 2 to be properly locked.

In the precedingly disclosed embodiment of the gun as illustrated in Figs. 1 to 13, it is of interest to examine the action of the gases on the missile, as shown in Figs. 14 and 15. In practice and as illustrated in Fig. 14, the cylindrical head 23¹ of the fastener 23 engages the gun barrel 3 with a certain clearance. After the striking of the cartridge 24, the fastener is first energetically urged forwardly by the gases which exert a normal thrust on it until the fastener has reached about the middle of the length of the barrel. Then, the gases which assume a speed which is greater than that of the fastener, pass partly through the clearance remaining between the head of the fastener and the bore in the barrel and collect inside the barrel to the front of the fastener so as to exert thereby a counter-reaction, whereby they slow down and brake the progression of the fastener (Fig. 15). For this reason, I have provided in a modified embodiment an annular series of openings 3¹³ (Figs. 16 and 17) passing radially through the barrel wall and opening into the chamber 19² of the silencer 19 when the latter is urged against the surface to be driven (Fig. 16).

In this case, when the fastener 23 progresses inside the barrel 3 as provided by the thrust of the gases and the latter move at a speed above that of the fastener and pass ahead of the latter through the annular clearance surrounding the fastener head 23¹, the ports 3¹³ provide for the immediate exhaust of the gases into the chamber 19² of the silencer. The gases finally are exhausted into the atmosphere through further ports 19³ cut obliquely in the wall of the silencer, as shown in Figs. 16 and 17. Thus, the progression of the fastener is not slowed down by any braking action.

However, the ports 3¹³ are located at a predetermined distance from the cartridge chamber, so as to allow the gases to act, during a sufficient travel, on the fastener 23.

Figure 18:
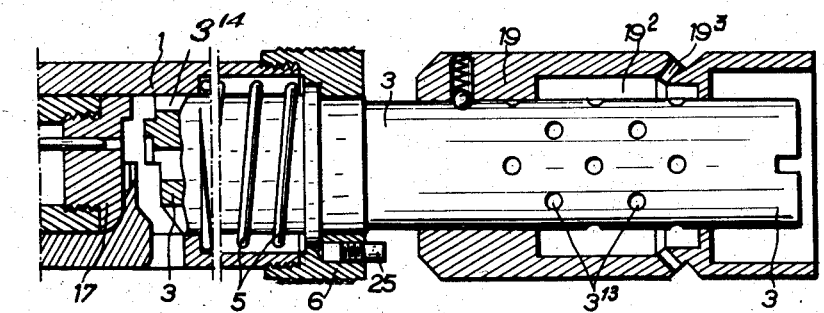
Fig. 18 is an elevational, partly sectional view of the front part of the gun in a modified embodiment.

To provide perfect safety, a stop 25 is secured, to the front of the ring 6 screwed over the breech casing (Fig. 18). The stop 25 may be integral with the ring 6 or again, it may be screwed or otherwise secured to said ring.

The stop 25 serves as an abutment for the receding stroke of the silencer 19 when sliding over the barrel 3. The stop 25 plays thus the part of auxiliary safety means as shown in Figs. 18, 19 and 20. The controllable length of stop 25 is such that the front surfaces of the barrel 3 and of the silencer 19 are in the same plane when the axis of the gun is perpendicular to the surface to be driven (Fig. 20). In the alternative when the axis of the gun is not perpendicular to the surface to be driven (Fig. 19), stop 25 engages the rear surface of silencer 19, while the barrel 3, which is urged forward by spring 5 (Fig. 18), protrudes from the silencer on account of the angle between the surface to be driven and the axis of the gun (Fig. 19); and in this alternative, the emergence of the barrel from the silencer leaves the offset $x$ between the rear end of the barrel 3 and the boss 17, which forms a safety offset and prevents firing, as already stated. Stop 25 is therefore an additional important safety device. The front surfaces of the silencer 19 and of the barrel 3 lie exactly in the same plane when the axis of the gun is perpendicular to the surface to be driven (Fig. 20). For this position, the plug 17 (also shown in Figs. 4, 6, 8, 18, 19) at the end of the movable breech block, is in contact with the rear surface of the barrel 3. The striker 16 may then be operative.

If the axis of the gun is not perpendicular to the surface to be driven, as shown in Fig. 19, then the front surfaces of the silencer 19 and of the barrel 3 engage obliquely said surface and the barrel 3 the diameter of which is smaller projects by a length $x$ with reference to the front bearing surface of the silencer 19.

This length $x$ is suitably defined so as to be always longer than the projecting section $y$ of the striker 16 between the plug 17 of the movable breech block and the rear end of the barrel 3, while leaving a gap between these two parts. Consequently, if the operator acts too early on the trigger, the striker 16 cannot perforate the cartridge case.

In order to ensure the desired safety in the case where the barrel is clogged (Figs. 21 and 22), it is of advantage to provide, at the periphery of the rear portion of the barrel 3, longitudinal grooves $3^{14}$ in any desired number, said grooves opening ahead of the ring 6. Consequently, in the case of a clogging of the barrel, the gases are exhausted to the rear of the barrel and pass, as they expand, through the longitudinal grooves $3^{14}$, as illustrated by the arrows in Fig. 21.

The exhaust of the gases which are capable of leaking rearward between the breech block casing 1 and the movable breech 2 can be furthered by annular grooves $2^5$ formed along the periphery of the rear portion of the breech block 2. The gases expand inside said grooves $2^5$ and are exhausted either through the upper slot $1^1$ in the breech casing 1 or through the ports $7^2$ in the butt 7 (Fig. 25). Otherwise the construction and the operation of the gun shown in Fig. 23 are the same as described heretofore, for instance in connection with Figs. 2, 3, and 4 to 8.

It is unnecessary to enter into any further detail relating to the advantages and interest of my improved explosively actuated gun, which advantages and interest are fully apparent from the above disclosure.

What I claim is:

1. An explosively actuated gun comprising in combination: a cylindrical breech casing; an axially bored breech-block movably guided in the rear portion of said casing; a longitudinally bored gun barrel slidingly mounted respectively to said casing and to said breech-block; said barrel having an annular rear seat for receiving fastener-holding cartridges from the rear of said barrel; a spring-actuated striker in the bore of said breech-block; a grip attached to the bottom of said casing; a longitudinal guide slot in the upper part of said casing; a peripheral notch in said casing in open communication with said guide slot; means connected to said breech-block, movable in said guide slot and in said notch, and adapted for urging said breech block forward in firing position, for locking it in said position in the casing and, after firing, for unlocking it and for moving it backward in said casing; a conical shoulder on said striker; a first longitudinal slot in the lower part of said casing; a second longitudinal slot in the lower part of the breech-block; a trigger disposed in said grip and projecting at right angle to said striker through said first and second slots; a spring in said grip normally urging said trigger through said first and second slots into the bore of said breech-block for engagement with said shoulder in the forward position of said striker before firing; a manually operated knob outside said grip and connected with said trigger, for moving said trigger against the action of said spring, thereby releasing said striker; the end of said trigger being beveled to permit said conical shoulder to depress said trigger when said breech-block is moved backward to open position.

2. An explosively actuated gun comprising in combination: a cylindrical breech casing; an axially bored breech-block movably guided in the rear portion of said casing; a longitudinally bored gun barrel slidingly mounted respectively to said casing and to said breech-block; said barrel having an annular rear seat for receiving fastener-holding cartridges from the rear of said barrel; a spring-actuated striker in the bore of said breech-block; a grip attached to the bottom of said casing; a longitudinal guide slot in the upper part of said casing; a peripheral notch in said casing in open communication with said guide slot; means connected to said breech-block, movable in said guide slot and in said notch, and adapted for urging said breech block forward in firing position, for locking it in said position in the casing, and after firing, for unlocking it and for moving it backward to open position in said casing; a conical shoulder on said striker; a first longitudinal slot in the lower part of said casing; a second longitudinal slot in the lower part of the breech-block; in said first slot, a longitudinally movable cartridge extractor, supported by the upper face of said grip; said extractor having a forward upward bent face, located between said breech-block and the rear end of the barrel, and adapted to receive and to hold the rear flange of a cartridge, said bent face forming a joint between the rear end of the barrel and the rear flange of the cartridge when the breech-block and striker are in forward firing position relative to the barrel; and means for retracting said extractor when said breech-block is moved from said firing position backward to open position, said means being connected respectively to the forward end of the breech-block and to the rear end of said extractor.

3. A gun as claimed in claim 2, in which said extractor retracting means comprise a flange at the head of the breech-block and a screw rigid with the rear end of said extractor and protruding into said second slot, said flange being adapted to engage said screw and to move said extractor.

4. An explosively actuated gun comprising in combination: a cylindrical breech casing, an axially bored breech-block movably guided in the rear portion of said casing; a longitudinally bored gun barrel slidingly mounted respectively to said casing and to said breech-block; said barrel having an annular rear seat for receiving fastener-holding cartridges from the rear of said barrel; a spring-actuated striker in the bore of said breech-block; a grip attached to the bottom of said casing; a longitudinal guide slot in the upper part of said casing; a peripheral notch in said casing in open communication with said guide slot; means connected to said breech-block, movable in said guide slot and said notch, and adapted for urging said breech-block forward in firing position, for locking it in said position in the casing and, after firing, for unlocking it and for moving it backward to open position in said casing; at the forward end of said casing an inner annular chamber surrounding and coaxial with the rear portion of said slidable barrel; a collar on said rear portion of said barrel, in and near the forward end of said chamber; an annular spring around said barrel between said collar and the rear wall of said chamber; said spring being adapted to be compressed after application of the mouth of the barrel on the surface to be driven and upon exertion of forward force on said grip, whereby said casing advances relative to said barrel, and said barrel engages the head of said breech-block in its forward position; a longitudinal slot in the rear section of said barrel; a screw supported by and through the walls of said grip and said casing and having an end projection inward of said casing, and adapted to be adjusted to bear against the wall of said longitudinal slot, whereby said barrel can be moved and guided axially in said casing.

5. An explosively actuated gun comprising in combination: a cylindrical breech casing; an axially bored breech-block movably guided in the rear portion of said casing; a longitudinally bored gun barrel slidingly mounted respectively to said casing and to said breech-block; said barrel having an annular rear seat for receiving fastener-holding cartridges from the rear of said barrel; a spring-actuated striker in the bore of said breech-block; a grip attached to the bottom of said casing; a longitudinal guide slot in the upper part of said casing; a peripheral notch in said casing in open communication with said guide slot; means connected to said breech-block, movable in said guide slot and in said notch, and adapted for urging said breech-block forward in position for firing said cartridges, for locking it in said position and, after firing, for unlocking it and for moving it rearward to open position in said casing; radial gas exhaust openings annularly distributed in the wall of said barrel at a substantial distance from the rear thereof and forward of the fastener-holding cartridge, whereby gases travelling forward at a speed greater than the fastener upon firing of the cartridge are evacuated without braking the forward progression of the fastener in the barrel.

6. A gun as claimed in claim 5, further comprising: a movable silencer around the forward section of the barrel; in said silencer, an annular chamber intermediate the length of the silencer and adapted to receive the gas from said radial gas exhaust openings; in the fore portion of the wall of said chamber, gas exhaust ports obliquely and forwardly directed; at the rear of said silencer, a pair of diametral spring and ball devices; in the wall of said barrel, two pairs of angularly spaced diametral recesses, said devices being adapted to selectively engage a pair of said recesses upon angular rotation of the silencer around the barrel; the forward inner longitudinal wall of said annular chamber forming an oval wall around said barrel and defining an oval space; two pairs of diametral gas ducts in the wall of said barrel and the openings of which face said forward inner longitudinal wall; said ducts, said oval space, said annular chamber and said gas exhaust ports forming a gas escape route; in one angular position of the silencer relative to the barrel, the two pairs of diametral ducts being in communication with said oval space; in the other angular position of the silencer, controlled by said devices and recesses, only one pair of said diametral ducts being in communication with said oval space; whereby the back pressure of the gas may be controlled by the relative angular displacement of the barrel and of the silencer.

7. An explosively actuated gun comprising in combination: a cylindrical breech casing; an axially bored breech-block movably guided in the rear portion of said casing; a longitudinally bored gun barrel slidingly mounted respectively to said casing and to said breech-block; said barrel having an annular rear seat for receiving fastener-holding cartridges from the rear of said barrel; a spring actuated striker in the bore of said breech-block; a longitudinal guide slot in the upper part of said casing; a peripheral notch in said casing in open communication with said guide slot; means connected to said breech-block, movable in said guide slot and in said notch, and adapted for urging said breech-block and striker forward in said casing in position to strike and fire said cartridge, for locking them in said position and, after striking and firing, for unlocking them and moving them backward in said casing to open position; a movable silencer around the forward section of said barrel; a safety stop protruding axially from the front end of said casing and adapted to abut the rear face of the silencer and constructed and adapted to prevent engagement of the rear of the barrel with the breech-block and striking engagement of the cartridge when the axis of the barrel and of the silencer, upon contact with the surface to be driven, are not perpendicular to said surface.

8. An explosively actuated gun comprising in combination: a cylindrical breech casing; an axially bored breech-block movably guided in the rear portion of said casing; a longitudinally bored gun barrel slidingly mounted respectively to said casing and to said breech-block; said barrel having an annular rear seat for receiving fastener-holding cartridges from the rear of said barrel; a spring actuated striker in the bore of said breech-block; a longitudinal guide slot in the upper part of said casing; a peripheral notch in the wall of said casing in open communication with said guide slot; means connected to said breech-block, movable in said guide slot and in said notch, and adapted for urging said breech-block and striker forward in said casing in position to strike and fire said cartridge, for locking them in said position and, after firing, for unlocking them and moving them rearward in said casing to open position, said means coacting with said peripheral notch to hold said breech-block and striker forward in said casing in said striking and firing position; a safety projecting boss on a small portion of the periphery of the front face of the breech-block; a projection in the rear wall of the barrel; a recess above said projection in the upper portion of said rear wall; said boss and said projection cooperating as a safety to prevent the striker from being brought within striking distance of the cartridge when the said means is not fully engaged in said notch and the breech-block is not properly positioned; said boss being adapted to engage said recess to bring the striker within operative distance to the cartridge solely when the breech-block has been properly positioned by full engagement of said means with said notch.

9. An explosively actuated gun comprising in combination: a cylindrical breech casing; an axially bored breech-block movably guided in the rear portion of said casing; a longitudinally bored gun barrel slidingly mounted respectively to said casing and to said breech-block; said barrel having an annular rear seat for receiving fastener-holding cartridges from the rear of said barrel; a spring actuated striker in the bore of said breech-block; a longitudinal guide slot in the upper part of said casing; a peripheral notch in said casing in open communication with said guide slot; means connected to said breech-block, movable in said guide slot and in said notch, and adapted for urging said breech-block and striker forward in said casing in position to strike and fire said cartridge, for locking them in engagement with said casing in said position and, after firing, for unlocking them and moving them rearward in said casing to open position; at the front end of said barrel, radial slots and arcuate recesses between said slots and adapted to receive washers having radial projections engaging said slots and recesses, and a washer holding bead projecting from the front of each said recesses.

References Cited in the file of this patent

UNITED STATES PATENTS

| | | |
|---|---|---|
| 1,549,847 | Reed | Aug. 18, 1925 |
| 2,504,311 | Dunn | Apr. 18, 1950 |
| 2,518,395 | Sopris | Aug. 8, 1950 |
| 2,594,275 | Baisch | Apr. 29, 1952 |
| 2,665,421 | Temple | Jan. 12, 1954 |
| 2,669,716 | Catlin | Feb. 23, 1954 |
| 2,679,645 | Erickson | June 1, 1954 |
| 2,702,902 | Portouw | Mar. 1, 1955 |